(12) United States Patent
Carlson (10) Patent No.: US 11,933,380 B2
(45) Date of Patent: Mar. 19, 2024

(54) CLUTCH MECHANISM FOR ROTARY POWER TOOL

(71) Applicant: MILWAUKEE ELECTRIC TOOL CORPORATION, Brookfield, WI (US)

(72) Inventor: Mitchell Carlson, Lisbon, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

(21) Appl. No.: 18/052,386

(22) Filed: Nov. 3, 2022

(65) Prior Publication Data

US 2023/0088139 A1 Mar. 23, 2023

Related U.S. Application Data

(63) Continuation of application No. 16/745,549, filed on Jan. 17, 2020, now Pat. No. 11,519,463, which is a
(Continued)

(51) Int. Cl.
*B25F 5/00* (2006.01)
*F16D 7/02* (2006.01)
(Continued)

(52) U.S. Cl.
CPC .............. *F16D 7/021* (2013.01); *B25F 5/001* (2013.01); *F16D 15/00* (2013.01); *F16D 23/12* (2013.01); *F16D 2023/123* (2013.01)

(58) Field of Classification Search
CPC .......... F16D 7/021; F16D 15/00; F16D 23/12; F16D 2023/123; F16D 7/10; F16D 41/064; F16D 2041/0646; B25F 5/001
(Continued)

(56) References Cited

U.S. PATENT DOCUMENTS

| 2,127,003 A | 8/1938 | Nash |
| 2,146,153 A | 2/1939 | Mathewson |

(Continued)

FOREIGN PATENT DOCUMENTS

| CN | 1287231 A | 3/2001 |
| CN | 1283423 A | 1/2003 |

(Continued)

OTHER PUBLICATIONS

International Search Report and Written Opinion for Application No. PCT/US2017/058716 dated Feb. 8, 2018 (17 pages).
(Continued)

*Primary Examiner* — Robert F Long
(74) *Attorney, Agent, or Firm* — Michael Best & Friedrich LLP (57) ABSTRACT

A clutch mechanism is used in a rotary power tool having a motor. The clutch mechanism includes an input member to which torque from the motor is transferred and an output member co-rotatable with the input member. The output member defines a rotational axis. A cam surface is formed on one of the input member or the output member. First and second compression springs are carried by the other of the input member or the output member for co-rotation therewith. A follower has a circular cross-sectional shape and is biased against the cam surface by the first and second compression springs. In response to relative rotation between the input member and the output member, the cam surface displaces the follower along a line of action coaxial or parallel with each of the first and second compression springs. The line of action does not intersect the rotational axis.

8 Claims, 11 Drawing Sheets

Related U.S. Application Data continuation of application No. 15/795,793, filed on Oct. 27, 2017, now Pat. No. 10,570,966.

(60) Provisional application No. 62/417,850, filed on Nov. 4, 2016.

(51) Int. Cl.
*F16D 15/00* (2006.01)
*F16D 23/12* (2006.01)

(58) Field of Classification Search
USPC .................................. 173/1–11, 90, 176–183
See application file for complete search history.

(56) References Cited

U.S. PATENT DOCUMENTS

| | | | |
|---|---|---|---|
| 2,909,047 A | 10/1959 | Walterscheid-Müller et al. | |
| 3,093,984 A | 6/1963 | Andrews et al. | |
| 3,318,390 A | 5/1967 | Hoza et al. | |
| 3,589,256 A | 6/1971 | Beach | |
| 3,593,542 A | 7/1971 | Urayama | |
| 3,688,522 A | 9/1972 | Schmuck | |
| 3,967,507 A | 7/1976 | Emms | |
| 3,971,463 A | 7/1976 | Zindler | |
| 4,253,556 A | 3/1981 | Zindler | |
| 4,309,043 A | 1/1982 | Brown | |
| 4,318,290 A | 3/1982 | Anderson | |
| 4,417,650 A | 11/1983 | Geisthoff | |
| 4,566,570 A | 1/1986 | Geisthoff | |
| 4,702,122 A | 10/1987 | Richard | |
| 4,869,353 A | 9/1989 | Ohtsuki et al. | |
| 4,877,185 A | 10/1989 | Kufrin | |
| 4,901,831 A | 2/1990 | Ito et al. | |
| 4,949,824 A | 8/1990 | Buckley et al. | |
| 5,090,532 A | 2/1992 | Bich | |
| 5,439,086 A | 8/1995 | Withey et al. | |
| 5,517,931 A | 5/1996 | Kawaguchi | |
| 5,653,509 A | 8/1997 | Bieri, Jr. | |
| 5,788,021 A * | 8/1998 | Tsai | B25B 21/00 408/239 R |
| 5,816,121 A | 10/1998 | Yoshimizu et al. | |
| 5,899,294 A | 5/1999 | Shimizu et al. | |
| 5,924,536 A | 7/1999 | Frenken | |
| 5,967,934 A | 10/1999 | Ishida et al. | |
| 6,012,985 A | 1/2000 | Sukup | |
| 6,666,283 B2 | 12/2003 | Frauhammer et al. | |
| 7,048,107 B1 | 5/2006 | Geis et al. | |
| 9,017,209 B1 | 4/2015 | Seith et al. | |
| 9,216,649 B2 | 12/2015 | Beasock et al. | |
| 9,393,681 B2 * | 7/2016 | Werner | F16D 7/021 |
| 2005/0034951 A1 | 2/2005 | Takasu | |
| 2005/0236247 A1 | 10/2005 | Muramatsu | |
| 2006/0000683 A1 | 1/2006 | Muramatsu | |
| 2006/0021840 A1 | 2/2006 | Kimes | |
| 2006/0278494 A1 | 12/2006 | Itomi | |
| 2007/0074885 A1* | 4/2007 | Aeberhard | F16F 15/129 173/217 |
| 2007/0131508 A1 | 6/2007 | Watanabe | |
| 2007/0201748 A1 | 8/2007 | Bixler et al. | |
| 2008/0087519 A1 | 4/2008 | Chu et al. | |
| 2009/0064810 A1 | 3/2009 | Bodine et al. | |
| 2009/0242347 A1 | 10/2009 | Satou | |
| 2010/0314211 A1 | 12/2010 | Shirataki et al. | |
| 2010/0314212 A1 | 12/2010 | Akiyoshi et al. | |
| 2011/0036212 A1 | 2/2011 | Santamarina et al. | |
| 2011/0048886 A1 | 3/2011 | Yamamoto et al. | |
| 2011/0108382 A1 | 5/2011 | Takada et al. | |
| 2011/0127059 A1 | 6/2011 | Limberg et al. | |
| 2011/0139471 A1 | 6/2011 | Braun et al. | |
| 2011/0139473 A1 | 6/2011 | Braun et al. | |
| 2012/0111688 A1 | 5/2012 | Komai et al. | |
| 2012/0152686 A1 | 6/2012 | Brewer et al. | |
| 2012/0160530 A1 | 6/2012 | Ikuta et al. | |
| 2012/0252585 A1 | 10/2012 | Stroissnigg et al. | |
| 2012/0285712 A1 | 11/2012 | Walker et al. | |
| 2013/0126290 A1 | 5/2013 | Parameswaran et al. | |
| 2013/0284477 A1 | 10/2013 | Braun | |
| 2014/0054057 A1 | 2/2014 | Ludy et al. | |
| 2014/0116833 A1 | 5/2014 | Hecht et al. | |
| 2014/0158489 A1 | 6/2014 | Yang | |
| 2015/0159743 A1 | 6/2015 | Palmer et al. | |
| 2015/0285317 A1 | 10/2015 | Lannutti | |
| 2015/0308512 A1 | 10/2015 | Vogel | |
| 2016/0010702 A1 | 1/2016 | Kitayama et al. | |
| 2016/0169300 A1 | 6/2016 | Yamatani et al. | |
| 2016/0186820 A1 | 6/2016 | Kitayama et al. | |
| 2016/0229043 A1 | 8/2016 | Wyler et al. | |
| 2016/0281800 A1 | 9/2016 | Kurita et al. | |
| 2016/0319736 A1 | 11/2016 | Okawa et al. | |
| 2016/0319891 A1 | 11/2016 | Saito et al. | |
| 2016/0348740 A1 | 12/2016 | Kitayama et al. | |
| 2017/0343058 A1 | 11/2017 | Lee | |
| 2017/0356506 A1 | 12/2017 | Takada | |
| 2018/0238402 A1 | 8/2018 | Saito et al. | |
| 2018/0274601 A1 | 9/2018 | Saito et al. | |
| 2018/0347643 A1 | 12/2018 | Itomi | |
| 2022/0128103 A1 | 4/2022 | Yoon | |

FOREIGN PATENT DOCUMENTS

| | | | | |
|---|---|---|---|---|
| DE | 3832202 C1 | 3/1990 | | |
| EP | 0608083 A1 | 7/1994 | | |
| EP | 1371458 A1 * | 12/2003 | ............ | B25D 16/00 |
| EP | 1731266 A2 | 12/2006 | | |
| EP | 2439422 A1 | 4/2012 | | |
| EP | 2471632 A1 | 7/2012 | | |
| EP | 2522466 A2 | 11/2012 | | |
| EP | 3144109 A1 | 3/2017 | | |
| GB | 2321089 A * | 7/1998 | ........... | B25D 16/006 |
| JP | H0719257 A | 1/1995 | | |
| WO | 2009156006 A1 | 12/2009 | | |
| WO | WO-2009156003 A1 * | 12/2009 | ........... | B25D 16/003 |
| WO | WO-2012008851 A1 * | 1/2012 | ........... | F16D 41/064 |

OTHER PUBLICATIONS

Chinese Patent Office Second Office Action for Application No. 201790001391.6 dated Mar. 11, 2020 (5 pages including English translation).

European Patent Office Extended Search Report for Application No. 17866990.9 dated Aug. 11, 2020 (8 pages).

European Patent Office Action for Application No. 17866990.9 dated Sep. 29, 2022 (5 pages).

* cited by examiner

CLUTCH MECHANISM FOR ROTARY POWER TOOL

CROSS-REFERENCE TO RELATED APPLICATIONS

This application is a continuation of U.S. application Ser. No. 16/745,549 filed on Jan. 17, 2020, now U.S. Pat. No. 11,519,463, which is a continuation of U.S. application Ser. No. 15/795,793 filed on Oct. 27, 2017, now U.S. Pat. No. 10,570,966, which claims priority to U.S. Provisional Application No. 62/417,850 filed on Nov. 4, 2016, the entire contents of all of which are incorporated herein by reference.

FIELD OF THE INVENTION

The present invention relates to rotary power tools, and more particularly to clutch mechanisms for rotary power tools.

BACKGROUND OF THE INVENTION

Clutch mechanisms in rotary power tools translate rotary motion of a motor into rotary motion of an output shaft of the tool. Such clutch mechanisms either slip at a fixed predetermined setting or an adjustable setting to limit the amount of torque from the motor that is transmitted to the output shaft.

SUMMARY OF THE INVENTION

The present invention provides, in one aspect, a clutch mechanism for use in a rotary power tool having a motor comprises an input member to which torque from the motor is transferred and an output member co-rotatable with the input member, the output member defining a rotational axis. The clutch mechanism further comprises a cam surface formed on one of the input member or the output member and first and second compression springs carried by the other of the input member or the output member for co-rotation therewith. The clutch mechanism also comprises a follower having a circular cross-sectional shape. The follower is biased against the cam surface by the first and second compression springs. In response to relative rotation between the input member and the output member, the cam surface displaces the follower along a line of action coaxial or parallel with each of the first and second compression springs. The line of action does not intersect the rotational axis.

The present invention provides, in another aspect, a rotary power tool comprising a motor, an output shaft, and a clutch mechanism positioned between the motor and the output shaft to transfer torque from the motor to the output shaft. The clutch mechanism includes an input member to which torque from the motor is transferred and an output member arranged within and co-rotatable with the input member. The output member defines a rotational axis. The clutch mechanism also includes a cam surface formed on one of the input member or the output member, a compression spring carried by the other of the input member or the output member for co-rotation therewith, and a follower having a circular cross-sectional shape biased against the cam surface by the compression spring. In response to relative rotation between the input member and the output member, the cam surface displaces the follower along a line of action coaxial or parallel with the spring. The line of action does not intersect the rotational axis.

The present invention provides, in yet another aspect, a method of operating a clutch mechanism in a rotary power tool having a motor. The clutch mechanism includes an input member and an output member. The method comprises the following steps, in order. The method comprises biasing a follower, which has a circular cross-sectional shape, with a compression spring carried by the output member against a mating segment of a cam surface of the input member. The method then comprises rotating the input member about a rotational axis. The method then comprises applying a normal force from the cam surface to the follower along a line of action that is parallel with a longitudinal axis of the compression spring. The method then comprises imparting a moment to the output member, such that the output member co-rotates with the input member. The method then comprises allowing a reaction torque applied to the output member to approach a predetermined value. The method then comprises rotating the input member relative to the output member, thereby compressing the compression spring and displacing the follower along the line of action. The follower moves relative to the input member, sequentially, to a first transition segment of the cam surface that is adjacent the mating segment, to an interior surface segment of the input member that is adjacent to the first transition segment, the interior surface defined by a minor radius having an origin at a geometric center of the input member, to a first connecting segment of the cam surface on a side of the cam surface that is opposite the first transition segment, and back into the mating segment of the cam surface. The first connecting segment has a radius that is greater than a radius of the mating segment and less than the minor radius of the interior surface.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
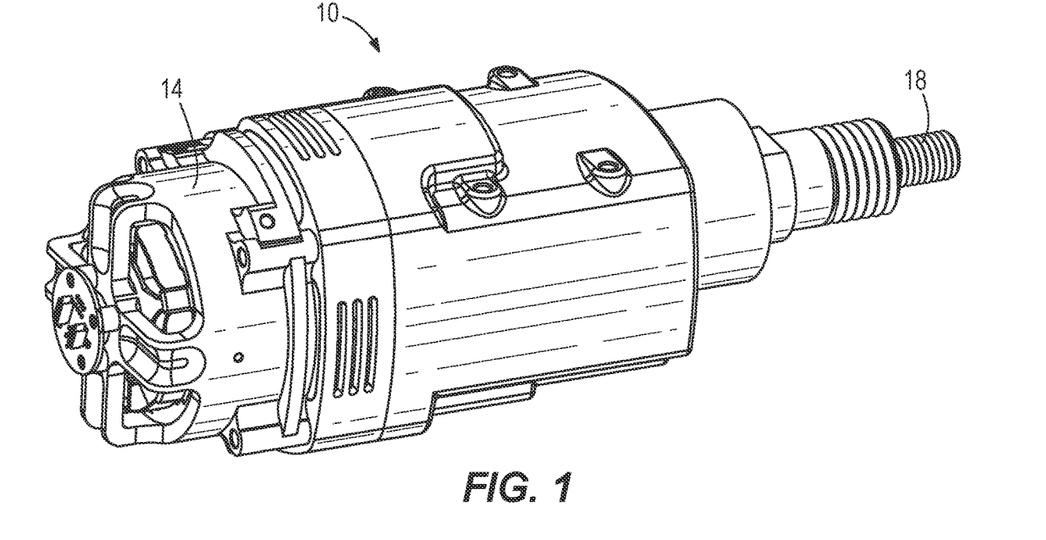
FIG. 1 is a perspective view of a rotary power tool with some portions omitted.
Figure 2:
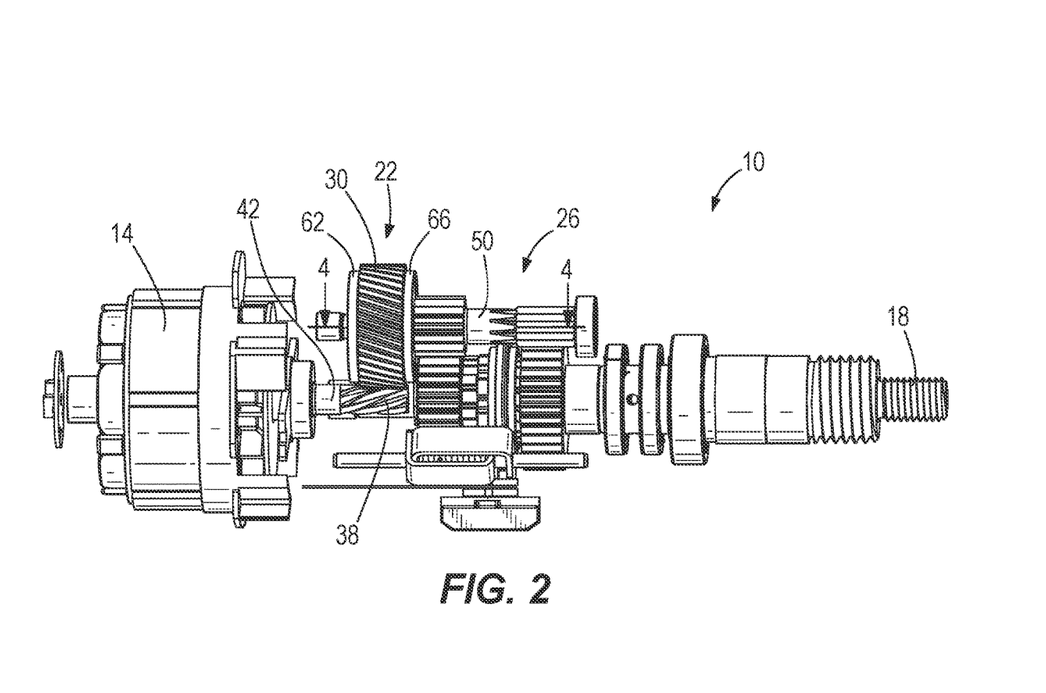
FIG. 2 is a plan view of the rotary power tool of FIG. 1 with the housing removed, illustrating a clutch mechanism in accordance with an embodiment of the invention.

With reference to FIG. 1, a rotary power tool 10, such as a core drill, includes a motor 14 and an output shaft 18 that receives torque from the motor 14. A tool bit (not shown) is coupled for co-rotation with the output shaft 18 to perform work on a workpiece. With reference to FIG. 2, the power tool 10 also includes a clutch mechanism 22 positioned between the motor 14 and the output shaft 18 to limit the amount of torque that can be transmitted from the motor 14 to the output shaft 18, and a transmission 26 positioned between the clutch mechanism 22 and the output shaft 18. The power tool 10 may be powered by an on-board power source (e.g., a battery, not shown) or a remote power source (e.g., an alternating current source) via a cord (also not shown).

Figure 3:
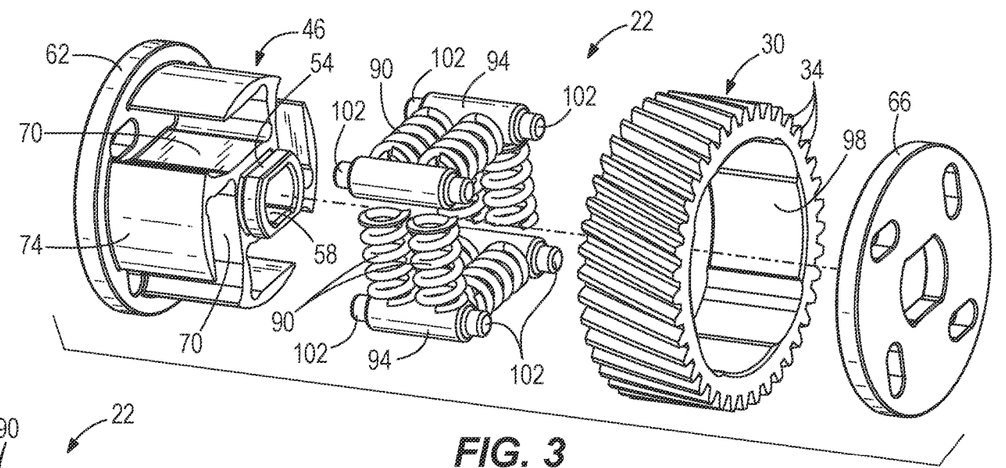
FIG. 3 is an exploded perspective view of the clutch mechanism of FIG. 2.
Figure 4:
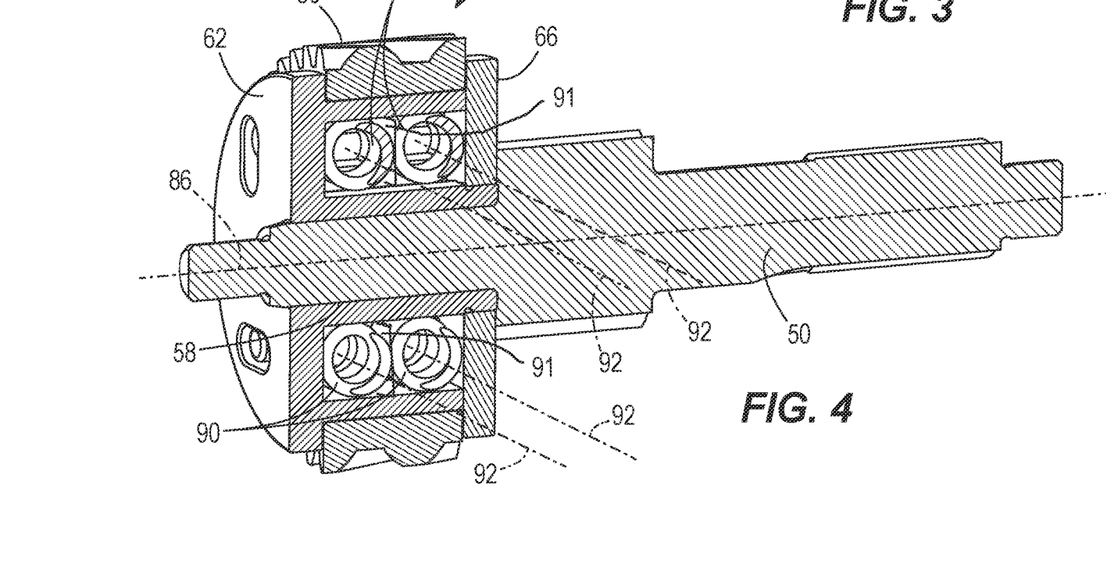
FIG. 4 is an assembled cross-sectional view of the clutch mechanism of FIG. 2.

With reference to FIG. 3, the clutch mechanism 22 includes an input member or outer ring 30 having outer teeth 34 meshed with a pinion gear 38 (FIG. 2) which, in turn, is attached to an output shaft 42 of the motor 14. Because the outer ring 30 and the pinion gear 38 are continuously enmeshed, the outer ring 30 will rotate in response to rotation of the motor output shaft 42. The clutch mechanism 22 also includes an output member or clutch driver 46 (FIG. 3) coupled for co-rotation with an intermediate shaft 50 of the transmission 26 (FIG. 4). The clutch driver 46 includes a hub 54 defining therethrough a central aperture 58 in which a portion of the intermediate shaft 50 having a corresponding cross-sectional shape is received. In the illustrated embodiment of the clutch mechanism 22 shown in FIG. 3, the aperture 58 has a non-circular "double-D" shape. Alternatively, other non-circular shapes (e.g., shapes coinciding with splines or a key and keyway arrangement) may be used. Alternatively, the aperture 58 may have a circular cross-sectional shape in which a portion of the intermediate shaft 50 having a corresponding circular cross-sectional shape is received via a heavy press fit. The clutch driver 46 also includes a rear end cap 62 integrally formed as a single piece with the hub 54 and a front end cap 66 secured to the hub 54 (e.g., using an interference fit or another joining method). The outer ring 30 is axially constrained between the end caps 62, 66, such that the only degree of freedom between the outer ring 30 and the clutch driver 46 is rotation. In an alternative embodiment of the clutch mechanism 22, the rear end cap 62 may be separately formed from the hub 54 and secured thereto using an interference fit or another joining method similarly to the front end cap 66.

Figures 5, 6:
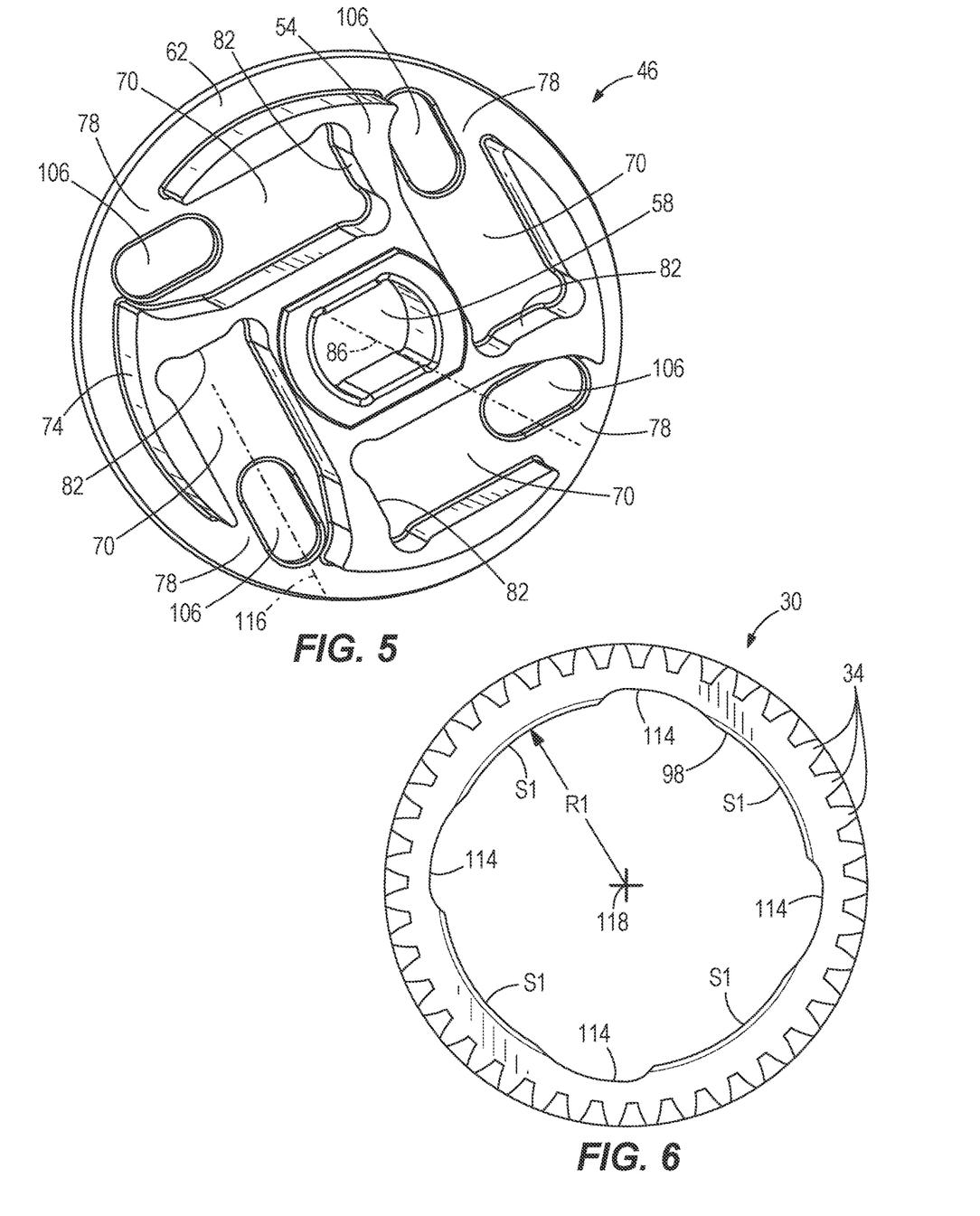
FIG. 5 is a perspective view of a clutch driver of the clutch mechanism of FIG. 3.
FIG. 6 is a plan view of a clutch gear of the clutch mechanism of FIG. 3.

With reference to FIGS. 3 and 5, the clutch driver 46 includes multiple pockets 70 extending in an axial direction of the hub 54 between the end caps 62, 66. Each of the pockets 70 is positioned between the central aperture 58 and a cylindrical outer periphery 74 of the hub 54. Each of the pockets 70 includes an opening 78 (FIG. 5) at the circumferential outer periphery 74 of the hub 54 and an opposite base 82 at which the pocket 70 terminates within the hub 54. As shown in FIG. 5, the base 82 of each of the pockets 70 is oriented transverse to a rotational axis 86 of the clutch driver 46 through the central aperture 58.

Figure 10:
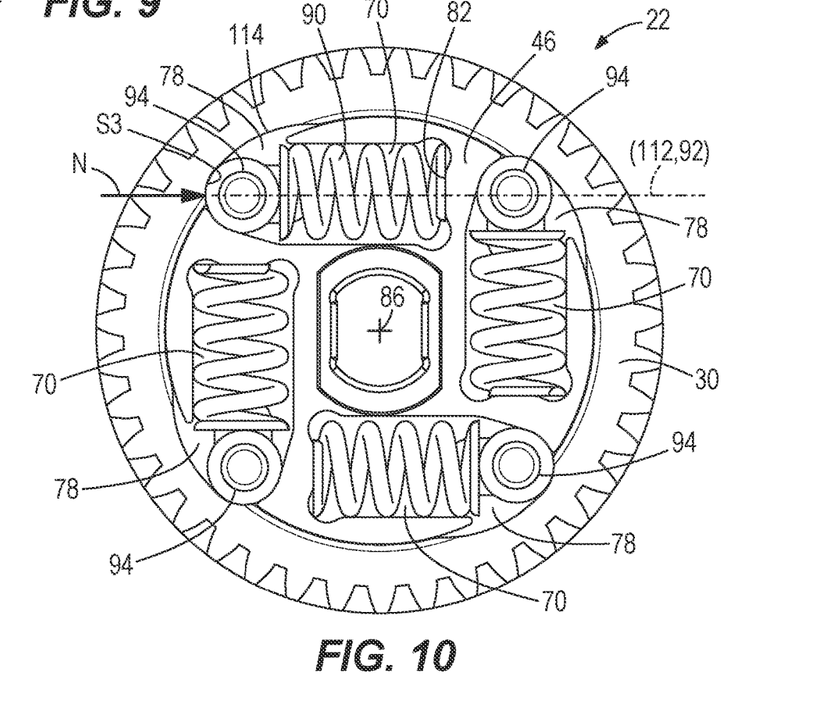
FIGS. 10-21 are plan views of the clutch mechanism, illustrating a sequence of operation.

The clutch mechanism 22 further includes at least one compression spring 90 within each pocket 70 (FIG. 3). In the illustrated embodiment of the clutch mechanism 22, two adjacent compression springs 90 are carried within each pocket 70. To prevent coil binding, a separator such as a thin sheet of metal 91 (FIG. 4) may be provided within the pocket 70 between the adjacent springs 90. As shown in FIG. 10, one end of each of the springs 90 is abutted against the base 82 of the pocket 70 in which the respective springs 90 reside, and an opposite end of each of the springs 90 protrudes from (or is at least proximate to) the openings 78 of the respective pockets 70. When positioned within the pockets 70, the respective longitudinal axes 92 of the springs 90 are oriented transverse to the rotational axis 86 of the clutch driver 46 (FIG. 4).

With reference to FIG. 3, the clutch mechanism 22 also includes a follower 94 disposed proximate the opening 78 of each pocket 70. Each follower 94 is biased outward by corresponding pairs of compression springs 90 against an interior surface 98 of the outer ring 30. In the illustrated embodiment of the clutch mechanism 22, the followers 94 have a circular cross-sectional shape as viewed in the axial direction, and are therefore configured as cylindrical rollers. Alternatively, the single cylindrical roller 94 for each pair of adjacent compression springs 90 may be replaced with dual spherical rollers associated with the respective springs 90.

Figure 8:
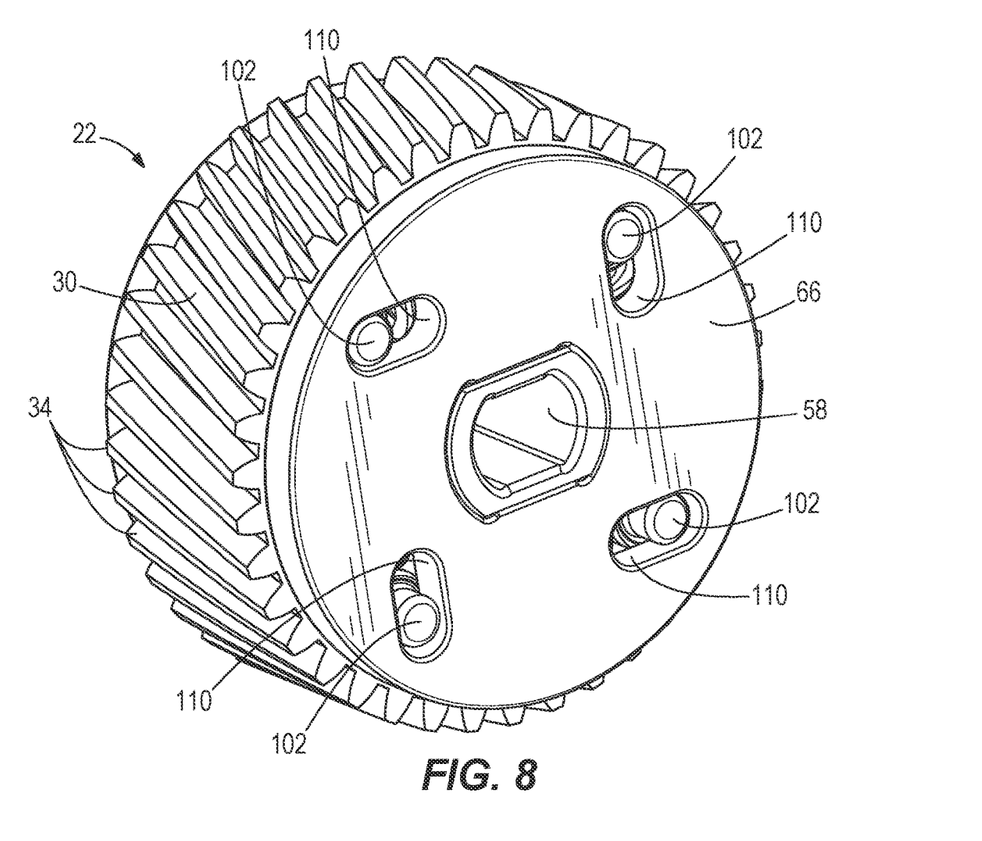
FIG. 8 is a front perspective view of the clutch mechanism of FIG. 2.
Figure 9:
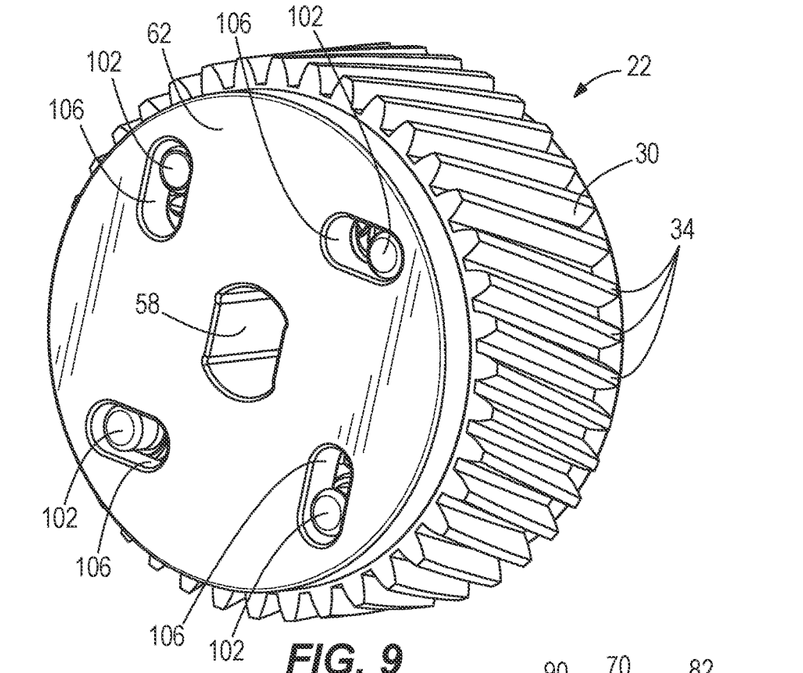
FIG. 9 is a rear perspective view of the clutch mechanism of FIG. 2.

Each of the followers 94 includes, on each side, a protruding portion 102 of a reduced diameter received within respective slots 106, 110 in the end caps 62, 66 (FIGS. 8 and 9). As shown in FIG. 5, the slots 106 in the rear end cap 62 are associated with the pockets 70 and are generally located proximate the openings 78 of the pockets 70. The slots 106 define longitudinal axes 116 parallel with the longitudinal axes of the springs 90. Like slots 110 are also located in the front end cap 66 (FIG. 8) and are oriented in the same direction as the slots 106 in the rear end cap 62 to constrain displacement of the followers 94 along the direction of the slot axes 116. Accordingly, when the followers 94 are displaced into the pockets 70 against the bias of the springs 90, such displacement is constrained to be along a line of action 112 (FIG. 10) parallel with the longitudinal axes 92 of the corresponding springs 90 with which the followers 94 are in contact. Although not shown, the clutch mechanism 22 is packed with a lubricant (e.g., grease) between the interface of the outer ring 30 and the clutch driver 46.

Figure 7:
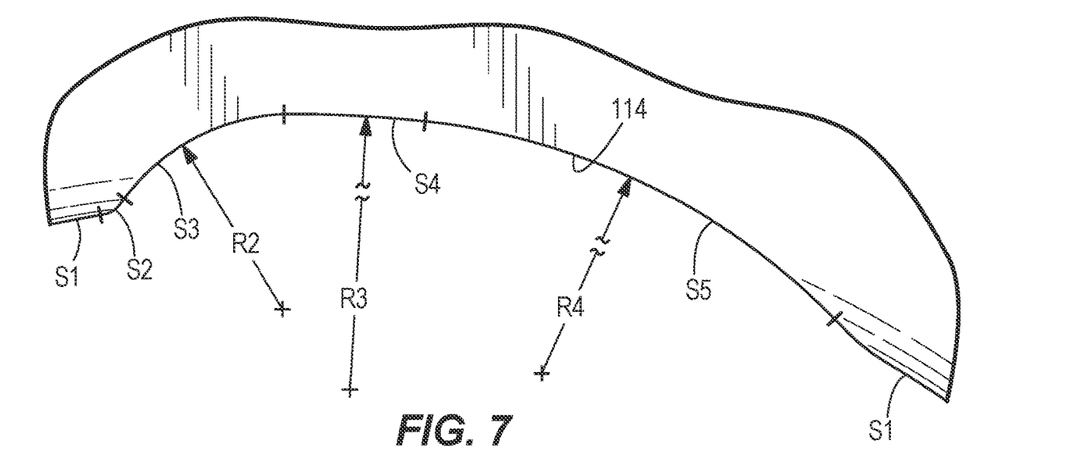
FIG. 7 is an enlarged view of a cam surface on the clutch gear of FIG. 6.
Figure 13:
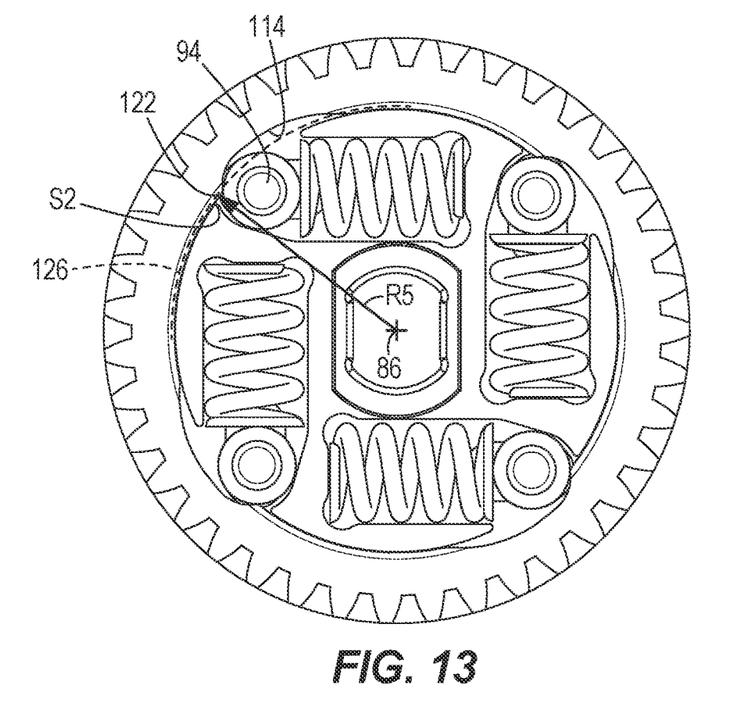
Figure 14:
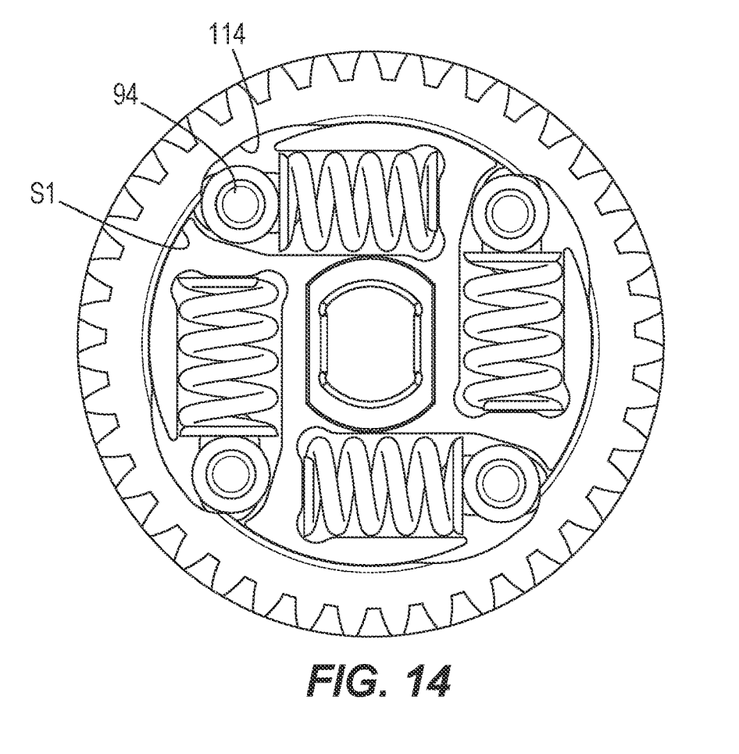
Figure 15:
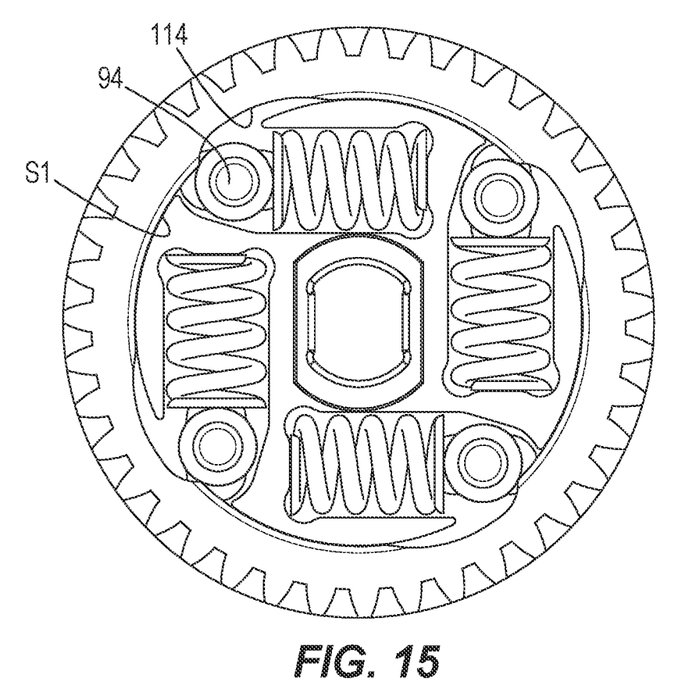
Figure 16:
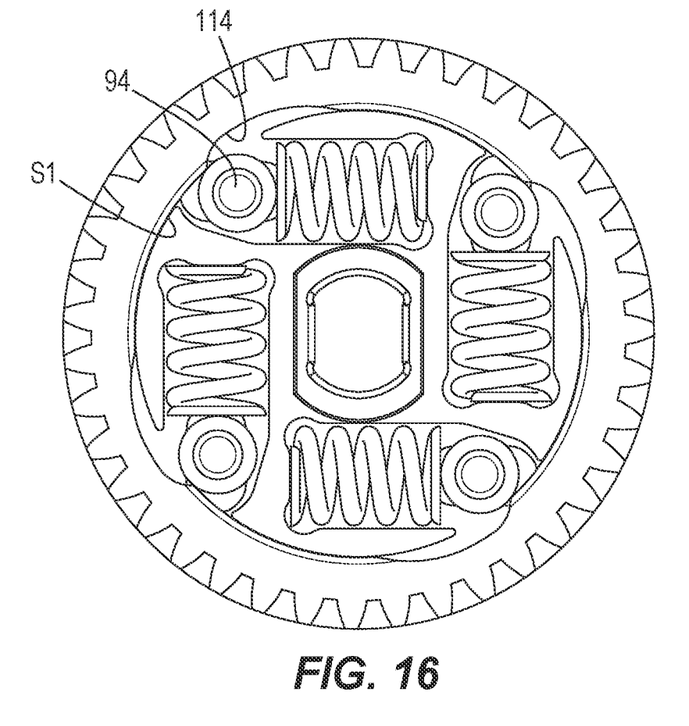

With reference to FIG. 6, the outer ring 30 includes cam surfaces 114 defined on the interior surface 98 of the outer ring 30 associated with the respective followers 94. In the illustrated embodiment of the clutch mechanism 22, the cam surfaces 114 are defined by recesses, each of which is defined by a composite multi-radius arc (FIG. 7). Adjacent each side of each of the cam surfaces 114, a segment S1 of the interior surface 98 of the outer ring 30 is defined by a minor radius R1 having an origin at the geometric center 118 of the outer ring 30 (FIG. 6). For purposes of illustration only, this geometric center 118 is shown by crosshairs in FIGS. 6 and 13. Adjacent the segment S1 on the left side of the cam surface 114 from the frame of reference of FIG. 7 is a first transition segment S2 of the cam surface 114, which in turn is adjacent a mating segment S3 with which a respective follower 94 is in contact during normal operation of the power tool 10 below the predetermined value of torque at which the clutch mechanism 22 slips. Although not separately identified, a small exit radius is formed between the segments S1, S2 to eliminate a sharp edge between the segment S1 and the cam surface 114. For purposes of illustration only, the boundaries of the segments S1, S2, S3, as well as the remaining segments described below, are shown by tick lines intersecting the cam surface 114 in FIG. 7. The mating segment S3 of the cam surface 114 is defined by a radius R2 that is nominally greater than the radius of the follower 94 itself, whereas the first transition segment S2 is a straight line tangent to the mating segment S3 that joins the segment S1 to the mating segment S3. Still viewing FIG. 7, to the right of the mating segment S3 is a segment S4 of the interior surface 98 of the outer ring 30 defined by a major radius R3 having an origin at the geometric center 118 of the outer ring 30. The major radius R3 is greater than all the other radii defining the cam surface 114. Still viewing FIG. 7, to the right of the segment S4 is a connecting segment S5, the radius R4 of which is less than the radius R3 of the segment S4 but greater than the radius R2 of the mating segment S3. Lastly, to the right of the connecting segment S5 is a small entrance radius (not separately labeled) to eliminate a sharp edge between the segment S5 and the segment S1. Each of the cam surfaces 114 in the outer ring 30 is identical to the cam surface 114 shown in FIG. 7.

In operation of the power tool 10, an operator actuates a trigger (not shown) on the power tool 10 to drive the motor 14, causing the motor shaft 42 to rotate the outer ring 30 in a clockwise direction from the frame of reference of FIG. 10. Below the predetermined value of torque at which the clutch mechanism 22 slips, the springs 90 maintain the followers 94 abutted against the mating segments S3 of the respective cam surfaces 114. Therefore, as the outer ring 30 rotates in a clockwise direction, the mating segments S3 of the respective cam surfaces 114 apply a normal force N to the follower 94 and springs 90 along a line of action 112 parallel with the longitudinal axes 92 of the springs 90. Because the springs 90 bear against the base 82 of the respective pockets 70, the normal force N is also applied to the clutch driver 46 in a direction transverse to the rotational axis 86 of the clutch driver 46, imparting a moment to the clutch driver 46 and causing it to co-rotate with the outer ring 30. And, because the intermediate shaft 50 is coupled for co-rotation with the clutch driver 46, torque is transmitted to the intermediate shaft 50, which then drives the transmission 26 and the output shaft 18 of the power tool 10.

Figure 11:
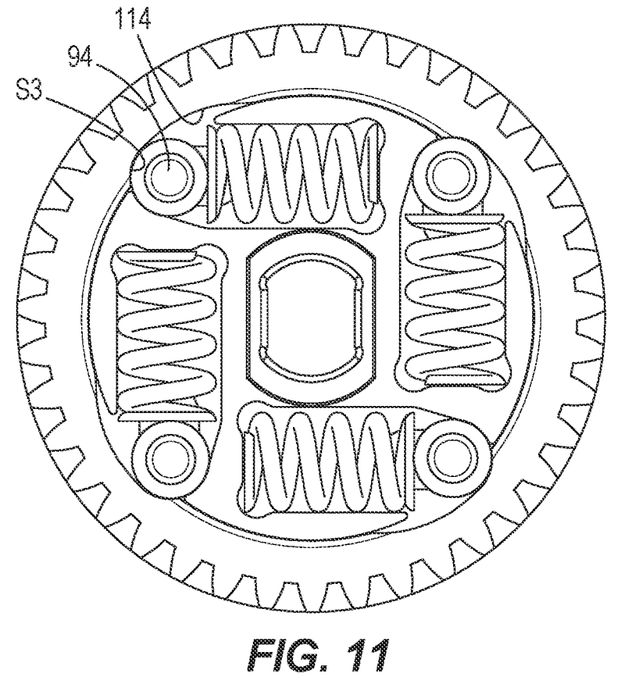
Figure 12:
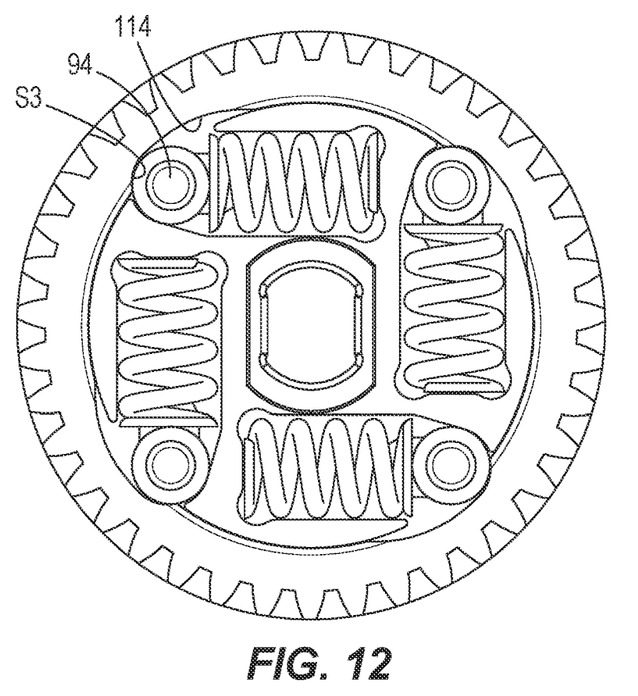

However, when the reaction torque applied to the output shaft 18 of the power tool 10 approaches the predetermined value at which the clutch mechanism 22 slips, the outer ring 30 begins to rotate relative to the clutch driver 46 (in a clockwise direction, shown in sequence in FIGS. 10-21), causing the followers 94 to slide and/or roll along the mating segments S3 of the respective cam surfaces 114 while being displaced along the line of action 112. Displacement of the followers 94 is constrained along the line of action 112 by the shape of the guide slots 106, 110 in the rear and front end caps 62, 66. As a result, the followers 94 cannot slide and/or roll relative to the pockets 70 in a direction transverse to the line of action 112, eliminating any friction that might otherwise develop between the followers 94 and the pockets 70 from such movement. Furthermore, the variability of such frictional forces is also eliminated, reducing the overall variability in the torque value at which the clutch mechanism 22 slips. While the followers 94 are gradually displaced into the pockets 70 and as the springs 90 gradually compress in a corresponding manner, the followers 94 gradually slide and/or roll from the mating segments S3 of the respective cam surfaces 114 toward the first transition segment S2, as shown in FIGS. 11 and 12.

Upon the followers 94 reaching the first transition segment S2 (FIG. 13), the component of the normal force N imparted on the followers 94 by the cam surface 114 (resolved along the line of action 112) is at its highest value. At this time, a radius of contact R5 exists between the geometric center 118 of the outer ring 30 and a point 122 tangent to each of the followers 94 and the respective cam surface 114. In other words, the radius of contact R5 is the radius of a phantom circle 126 that is coaxial with the geometric center 118 of the outer ring 30 and that intersects the tangent points 122 when the component of the normal force N applied to the followers 94 by the cam surface 114 (resolved along the line of action 112) is at its highest value. In one embodiment of the clutch mechanism 22, the radius of contact R5 is less than about 0.9 inches. In another embodiment of the clutch mechanism 22, the radius of contact R5 is less than about 0.8 inches. In yet another embodiment of the clutch mechanism 22, the radius of contact R5 is between about 0.9 inches and about 0.7 inches. In a further embodiment of the clutch mechanism 22, the radius of contact R5 is about 0.7 inches. By maintaining a small radius of contact R5, the clutch mechanism 22 can impart more of the motor's torque to the output shaft 18 of the power tool 10, while fitting within a smaller design envelope.

Upon continued rotation of the outer ring 30 relative to the clutch driver 46, the followers 94 disengage the cam surfaces 114 (first shown in FIG. 14) and transition into contact with the segments S1, causing the component of the normal force N resolved along the line of action 112, applied to the clutch driver 46 through each of the followers 94, to be quickly reduced to zero or a nominal value insufficient to impart a moment to the clutch driver 46 to cause its continued rotation. At this time, the clutch driver 46, the intermediate shaft 50, the transmission 26, and the output shaft 18 seize. But, continued activation of the motor 14 drives the outer ring 30 in a clockwise direction, causing it to slip relative to the clutch driver 46 as shown in the sequence of FIGS. 14-19.

Figure 17:
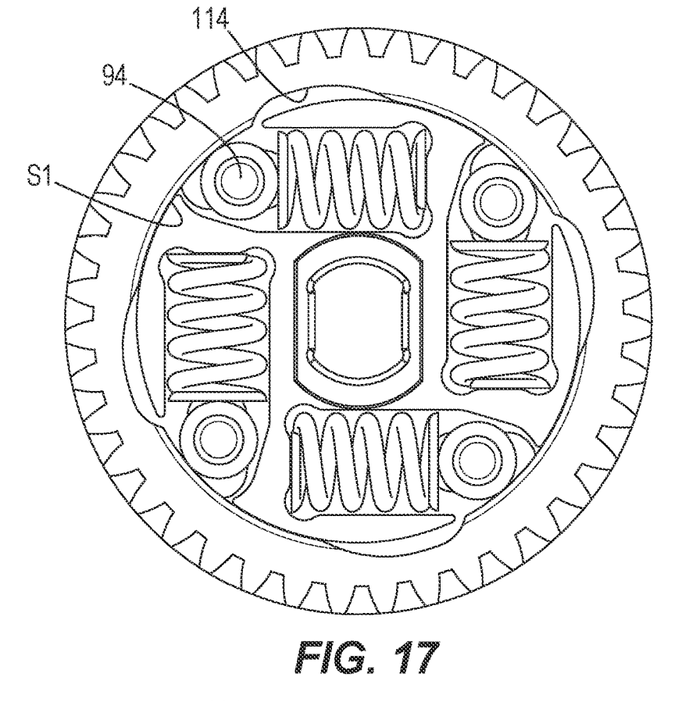
Figure 18:
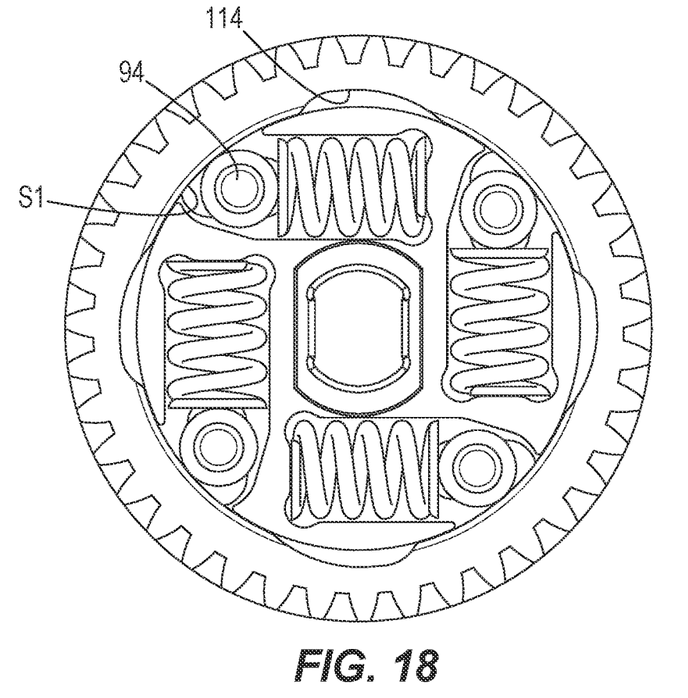
Figure 19:
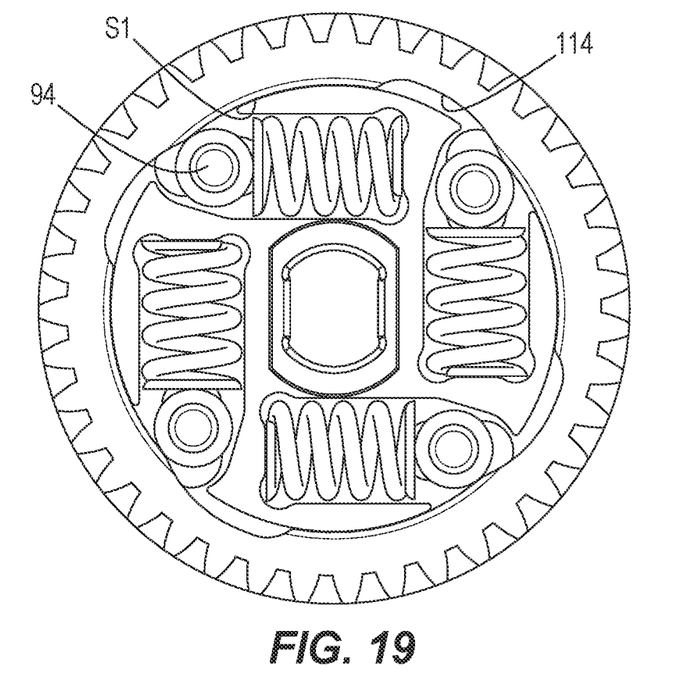
Figure 20:
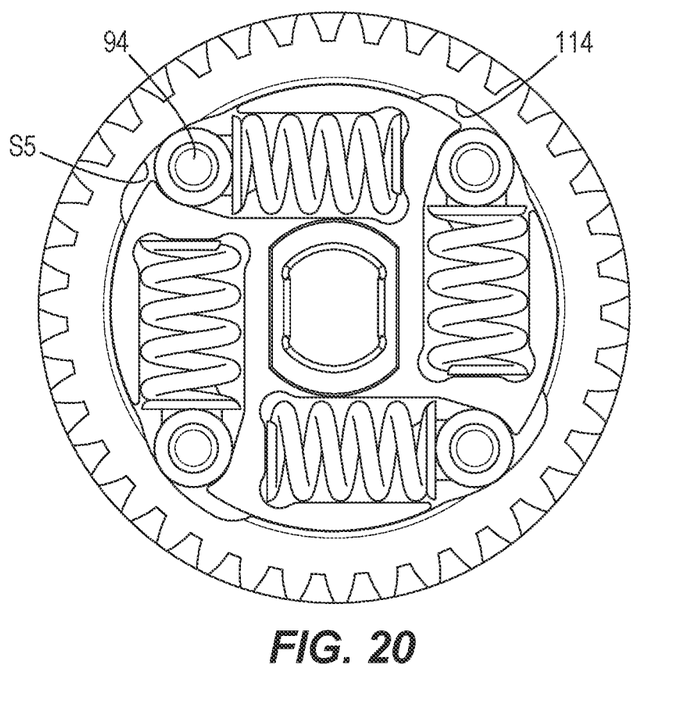
Figure 21:
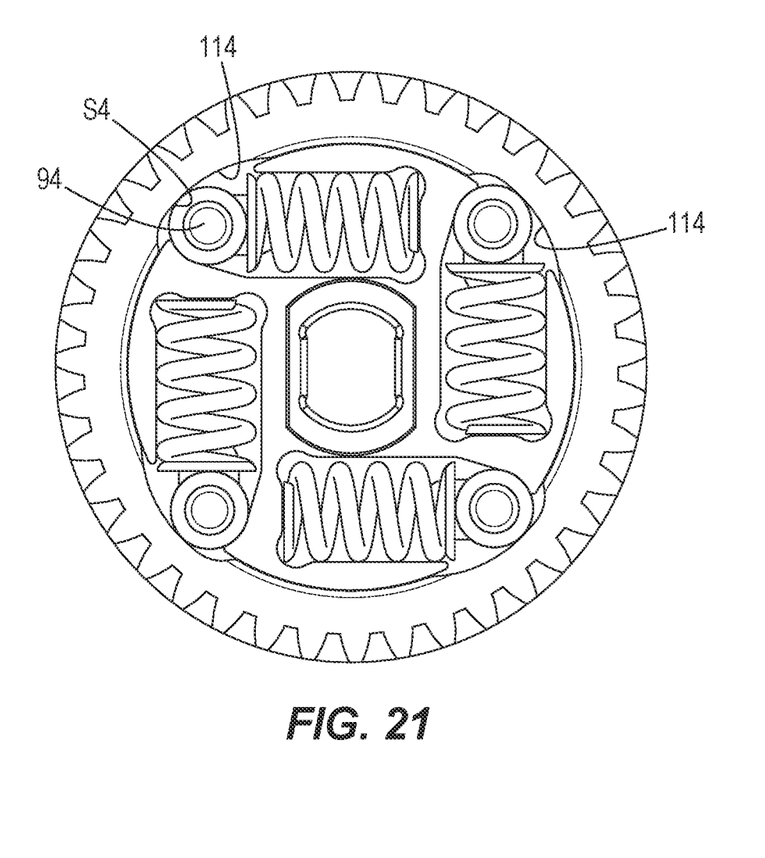

As shown in FIGS. 17-19, the outer ring 30 continues to rotate about the clutch driver 46 while the followers 94 slide and/or roll along the interior surface segments S1 until the followers 94 reach the next adjacent cam surface 114, at which time the compression springs 90 rebound and push the followers 94 onto the cam surfaces 114. As shown in FIGS. 20 and 21, the followers 94 slide and/or roll along the connecting segments S5 and the segments S4 of the respective cam surfaces 114 before re-engaging the mating segments S3 of the respective cam surfaces 114 (FIG. 10). If the reaction torque on the output shaft 18 of the power tool 10 continues to remain above the predetermined value at which the clutch mechanism 22 slips, the outer ring 30 will continue to rotate relative to the clutch driver 46 as shown in the sequence of FIGS. 11-21. However, if the reaction torque on the output shaft 18 of the power tool 10 falls below the predetermined value at which the clutch mechanism 22 slips, upon the followers 94 re-engaging the mating segments S3 of the respective cam surfaces 114, a normal force N is again applied to the followers 94 to impart a moment to the clutch driver 46 to cause it to rotate.

In alternative embodiments of the clutch mechanism 22, the springs 90 could be set in pockets 70 defined in the outer ring 30 (i.e., the input member) and the cam surfaces 114 could be defined on the clutch driver 46 (i.e., the output member), with the clutch mechanism 22 functioning in the same manner as described above.

Because the cam surfaces 114 displace the followers 94 along a line of action 112 parallel with the longitudinal axes 92 of the springs 90, the variability in the torque value at which the clutch mechanism 22 slips is reduced. Further, the torque value at which the clutch mechanism 22 slips is more repeatable. In addition, by using dual springs 90 in each pocket 70, the clutch mechanism 22 has a higher torque-transmitting capacity compared to conventional clutch mechanisms (which use a single spring per pocket) for use with rotary power tools. As mentioned above, the clutch mechanism 22 also provides a reduced radius of contact R5 compared to conventional clutch mechanisms for use with rotary power tools, which saves on material costs and reduces the size of the tool, which provides greater portability.

Various features of the invention are set forth in the following claims.

What is claimed is:

1. A method of operating a clutch mechanism in a rotary power tool having a motor, the clutch mechanism including an input member and an output member, the method comprising the following steps, in order:
    biasing a follower, which has a circular cross-sectional shape, with a compression spring carried by the output member, against a mating segment of a cam surface of the input member;
    rotating the input member about a rotational axis;
    applying a normal force from the cam surface to the follower along a line of action that is parallel with a longitudinal axis of the compression spring;
    imparting a moment to the output member, such that the output member co-rotates with the input member;
    allowing a reaction torque applied to the output member to approach a predetermined value; and
    rotating the input member relative to the output member, thereby compressing the compression spring and displacing the follower along the line of action, wherein the follower moves relative to the input member, sequentially,
        to a first transition segment of the cam surface that is adjacent the mating segment,
        to an interior surface segment of the input member that is adjacent the first transition segment, the interior surface defined by a minor radius having an origin at a geometric center of the input member,
        to a first connecting segment of the cam surface on a side of the cam surface that is opposite the first transition segment, and
        back into the mating segment of the cam surface,
    wherein the first connecting segment has a radius that is greater than a radius of the mating segment and less than the minor radius of the interior surface.

2. The method of claim 1, wherein after the follower moves into the first connecting segment of the cam surface and before the follower moves back into the mating segment of the cam surface, the follower moves along a second connecting segment of the cam surface, and wherein the second connecting segment is defined by a major radius that is greater than the radius of the first connecting segment.

3. The method of claim 1, wherein after the follower moves to the interior surface segment, and before the follower moves to the first connecting segment, the follower moves along a second cam surface of the input member that is adjacent the interior surface segment.

4. The method of claim 3, wherein after the follower moves along the second cam surface, and before the follower moves to the first connecting segment, the follower moves along a third cam surface and a fourth cam surface.

5. The method of claim 1, wherein upon the follower moving to the first transition segment of the cam surface, a component of the normal force imparted on the follower by the cam surface is at a maximum value.

6. The method of claim 1, wherein upon the follower moving to the first transition segment of the cam surface, a radius of contact exists between the geometric center of the input member and a point tangent to the follower and the cam surface.

7. The method of claim 1, wherein upon the follower moving to the interior surface segment of the input member, a component of the normal force resolved along the line of action is reduced to a value insufficient to impart a moment to the output member, such that the output member no longer rotates with the input member.

8. The method of claim 1, wherein upon the follower moving back into the mating segment of the cam surface, if the reaction torque on the output member has fallen below the predetermined value, the method further comprises the steps of:
    applying the normal force from the mating segment to the follower along the line of action; and
    imparting the moment to the output member, such that the output member co-rotates with the input member.

* * * * *